US010956158B2

(12) United States Patent
Battle et al.

(10) Patent No.: US 10,956,158 B2
(45) Date of Patent: Mar. 23, 2021

(54) SYSTEM AND HANDLING OF REGISTER DATA IN PROCESSORS

(71) Applicant: International Business Machines Corporation, Armonk, NY (US)

(72) Inventors: Steven J. Battle, Austin, TX (US); Khandker N. Adeeb, Travis, TX (US); Brian D. Barrick, Pflugerville, TX (US); Joshua W. Bowman, Austin, TX (US); Thao T. Doan, Austin, TX (US); Susan E. Eisen, Round Rock, TX (US); Brandon Goddard, Kirkland, WA (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/408,749

(22) Filed: May 10, 2019

(65) Prior Publication Data

US 2020/0356366 A1    Nov. 12, 2020

(51) Int. Cl.
*G06F 9/30* (2018.01)
*G06F 9/38* (2018.01)

(52) U.S. Cl.
CPC ........ *G06F 9/3012* (2013.01); *G06F 9/30141* (2013.01); *G06F 9/3832* (2013.01)

(58) Field of Classification Search
CPC .................................................. G06F 9/3012
See application file for complete search history.

(56) References Cited

U.S. PATENT DOCUMENTS

| 7,058,834 | B2 | 6/2006 | Woods et al. |
| 7,269,780 | B2 | 9/2007 | Arima et al. |
| 9,362,948 | B2 | 6/2016 | Kuila et al. |
| 9,898,298 | B2 | 2/2018 | Offen et al. |
| 2008/0077782 | A1* | 3/2008 | Lataille .................. G06F 9/384 712/244 |

(Continued)

FOREIGN PATENT DOCUMENTS

WO    2012087457 A1    6/2012

OTHER PUBLICATIONS

Dhodapkar, A.S. et al., "Saving and Restoring Implementation Contexts with co-Designed Virtual Machines.".

*Primary Examiner* — Michael J Metzger
(74) *Attorney, Agent, or Firm* — Scully, Scott, Murphy & Presser, P.C.

(57) ABSTRACT

A method, processor and system for processing data is disclosed that includes evicting one or more evicted fields from a logical register mapper; receiving, by a history buffer, the one or more evicted fields from the logical register mapper; determining whether two or more of the evicted fields from the mapper qualify to be written to a single entry in the history buffer; and in response to the two or more evicted fields qualifying, writing the two or more qualifying evicted fields received from the mapper to a single entry in the qualified history buffer. The method, processor, and/or system further includes in an embodiment, remapping the one or more qualified evicted fields, and further, in response to the two or more evicted fields not qualifying to be written to a single entry in the history buffer, writing the two or more evicted fields to multiple history buffer entries.

15 Claims, 8 Drawing Sheets

(56) References Cited

U.S. PATENT DOCUMENTS

| | | | |
|---|---|---|---|
| 2014/0244977 A1* | 8/2014 | Garbacea | G06F 9/5011 |
| | | | 712/216 |
| 2016/0253181 A1* | 9/2016 | Chadha | G06F 9/30101 |
| | | | 712/216 |
| 2017/0322742 A1 | 11/2017 | Del Giudice et al. | |

* cited by examiner

| Reg.# | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 481— 1 | | | | | | Field A | | Field B | | Field C | | | | | | | | |
| 482— 2 | Field D | | | | | | | | | | | | Field E | | | Field F | | |
| 483— 3 | Field G | | | | Field H | | | | Field I | | | | Field J | | | | | |
| 484— 4 | Field K | | | | Field L | | | | Field M | | | | Field N | | | | | |

| Tag | Field Usage | Free? |
|---|---|---|
| 0 | 1111 | N |
| 1 | 0000 | Y |
| 2 | 1000 | N |
| 3 | 1100 | N |
| 4 | 1110 | N |
| • | • | • |

Fig. 5

SYSTEM AND HANDLING OF REGISTER DATA IN PROCESSORS

BACKGROUND OF INVENTION

The present invention generally relates to information handling and data processing systems, processors, and more specifically handling data in registers in a processor.

Modern information and data handling systems and processors often execute instructions out of order to achieve greater processing efficiency. Processors, to handle executing out-of-order instructions, typically are "pipelined" and have multiple elements that operate in parallel to process multiple instructions in a single processing cycle. Pipelining involves processing instructions in stages, so that the pipelined stages may process a number of instructions concurrently. To improve throughput, processors may include multiple pipelines or execution slices within each processor core. Multiple execution slices may be used as part of simultaneous multi-threading (SMT) within a processor core.

Typically a processor pipeline may refer to a set of data processing circuitry or hardware units connected in series within a processor. The processor pipeline usually includes a number of stages, and may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually registers and queues associated with the processor, execution units, and/or the issue queue (ISQ) to hold data, information and/or instructions for the execution units.

Out-of-order processors execute instructions as soon as its operands are available (and valid), independent of the original instruction sequence. Consequently, as these processors execute out-of-order instructions, they generate numerous temporary register results. The temporary values are stored together with completed values in register files. The temporary values become complete or permanent values when the corresponding instructions are complete. In out-of-order processors, an instruction can change a register value before all of the prior instructions complete. If any of the prior instructions cause an exception or interruption, then all of the sequential instructions prior to the time of the exception, e.g., an interruptible instruction, will need to be flushed. As a result, the registers allocated to the instruction being flushed will also need to be flushed.

One of the complexities in handling and processing out-of-order instructions is restoring the processor state in the event of an interruptible instruction, e.g., a mispredicted branch instruction. In this regard, registers will need to be restored to the state they were in before the exception, e.g., interruptible instruction. Out-of-order processors typically have a history buffer, e.g., Save & Restore Buffer (SRB), that stores the content of logical registers in order to recover the content in the event of an exception. If an exception occurs, for example, a branch mispredict, then typically the content of the logical registers is flushed, and data is recovered from the history buffer, e.g., Save & Restore buffer (SRB), to place the logical registers in the condition that existed before the exception, e.g., the interruptible instruction.

SUMMARY

The summary of the disclosure is given to aid understanding of a computer system, computer architectural structure, processor, and method of handling information including combining fields in registers and history buffers in a processor, and in an aspect reducing the number of entries in registers and history buffers, and/or increasing the processor core out-of-order bandwidth, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

In an embodiment, a method of processing data in a processor is disclosed. The method in an aspect includes evicting one or more evicted fields from a logical register mapper; receiving, by a history buffer, the one or more evicted fields from the logical register mapper; determining whether two or more of the evicted fields from the mapper qualify to be written to a single entry in the history buffer; and in response to the two or more evicted fields qualifying to be written to a single entry in the history buffer, writing the two or more qualifying evicted fields received from the mapper to a single entry in the qualified history buffer. The method in an embodiment further comprising remapping one or more of the qualified evicted fields, and in a further aspect, includes, in response to the two or more evicted fields not qualifying to be written to a single entry in the history buffer, writing the two or more evicted fields to multiple history buffer entries.

The method according to an embodiment further includes changing the field code of the history buffer entry to which two or more qualifying evicted fields were written to a combination code. Determining whether two or more evicted fields qualify to be written to a single history buffer entry in an embodiment includes determining whether the instructions (iTags) of at least two of the evicted fields are the same. Determining whether two or more evicted fields qualify to be written to a single history buffer entry preferably in an embodiment alternatively or additionally includes determining whether at least two of the instructions that evicted the evicted fields (evictor iTags) are the same. In a further embodiment, determining whether two or more evicted fields qualify to be written to a single history buffer entry includes determining whether the register file tag (RFTag) of the evicted fields are that same.

In a further aspect, a system for processing information is disclosed. The system in an embodiment has at least one processor for processing instructions, the processor including one or more logical register mappers having a plurality of fields for storing data; and one or more history buffers having a plurality of entries for storing fields evicted from at least one of the logical register mappers. The processor in one or more embodiments is configured to evict one or more evicted fields from at least one of the logical register mappers; receive in the history buffer the one or more evicted fields from the at least one of the logical register mappers; determine whether the two or more of the evicted fields received from the at least one of the mappers qualify to be written to a single entry in the history buffer; and in response to the two or more evicted fields qualifying to be written to a single entry in the history buffer, writing the qualified two or more evicted fields from the logical register mapper to a single entry in the history buffer.

In an aspect, to determine whether two or more evicted fields qualify to be written to a single history buffer entry, the processor is further configured to determine whether at least two of the evicted fields are combination fields that are supported by the processor and have no overlapping bit ranges. In an embodiment, the history buffer has one or more recovery ports and the mapper is configured to receive incoming data from the one or more recovery ports of the history buffer, and the processor is configured to determine whether the incoming data from the history buffer recovery port includes a combination field code, and in response to the incoming data having a combination field code, to write the incoming data to two or more mapper fields in the mapper.

A system for processing data is also disclosed where the system has at least one processor for processing instructions; one or more logical register mappers for mapping logical register fields to entries in a physical register, each logical register mapper having a plurality of fields for storing data; one or more history buffers associated with the one or more logical register mappers, each history buffer having a plurality of entries for storing fields evicted from at least one of the logical register mappers; and non-transitory computer readable storage medium comprising program instructions. The program instructions in one or more embodiment when executed by the processor cause the processor to: evict one or more evicted fields from at least one of the logical register mappers; receive in the one or more history buffers the one or more evicted fields from the one or more of the logical register mappers; determine whether the two or more evicted fields received from the one or more mappers qualify to be written to a single entry in the one or more history buffers; and in response to the two or more evicted fields qualifying to be written to a single entry in the one or more history buffers, writing the qualified two or more evicted fields from the one or more of the logical register mappers to a single entry in the one or more history buffers.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, physical registers, logical registers, mappers, history buffers, and their method of operation will be better understood when read in conjunction with the figures provided. Embodiments are provided in the figures for the purpose of illustrating aspects, arrangements, features and/or various embodiments of the computer system, computer architectural structure, processor, physical registers, logical registers, mappers, history buffers, e.g, Save & Restore Buffers (SRB) and their method of operation, but the claims should not be limited to the precise arrangement, structures, systems, assemblies, subassemblies, features, aspects, methods, processes, embodiments, or devices shown, and the arrangements, structures, systems, assemblies, subassemblies, features, aspects, methods, processes, embodiments, and devices shown may be used singularly or in combination with other arrangements, structures, systems, assemblies, subassemblies, features, aspects, processes, methods, embodiments, and/or devices.

FIG. 4 illustrates a block diagram of physical registers having multiple fields.

FIG. 5 illustrates a block diagram of an embodiment a tracker mechanism for a physical register file.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, physical registers, logical registers, mappers, history buffers, e.g., SRBs, and their method of operation, however, it will be understood by those skilled in the art that different and numerous embodiments of the computer system, computer architectural structure, processor, physical registers, logical registers, mappers, history buffers, and their method of operation may be practiced without those specific details, and the claims and invention should not be limited to the embodiments, systems, arrangements, structures, assemblies, subassemblies, features, processes, methods, aspects, features, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and their architecture, which are apparent to those skilled in the art. It is assumed that those skilled in the art are familiar with the general architecture of processors, and in particular with processors which operate in an out-of-order execution fashion, including multi-slice processors and their use of mappers and history buffers to restore the contents of logical registers. It may be noted that a numbered element is numbered according to the figure in which the element is introduced, and is typically referred to by that number in succeeding figures.

Figure 1:
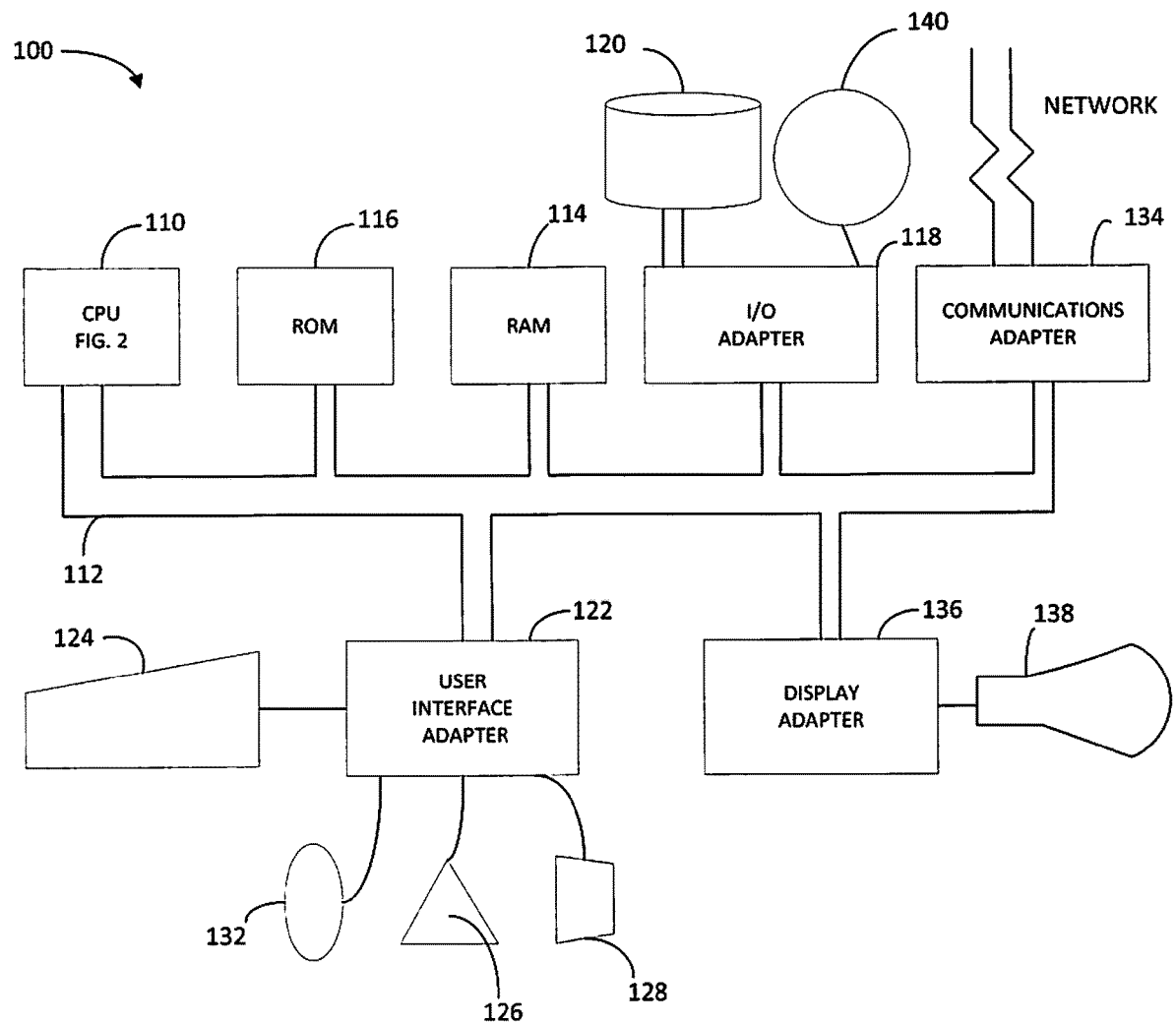
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. Processor 110 may have a bus interface unit coupled to the bus 112 for controlling transfers of data and instructions between memory, such as random access memory 114, and caches, e.g. instruction cache (I-Cache) and data cache (D-Cache). Data cache and instruction cache may each have various levels of cache, such as, for example, L1 cache, L2 cache, and/or L3 cache.

I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, queues, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
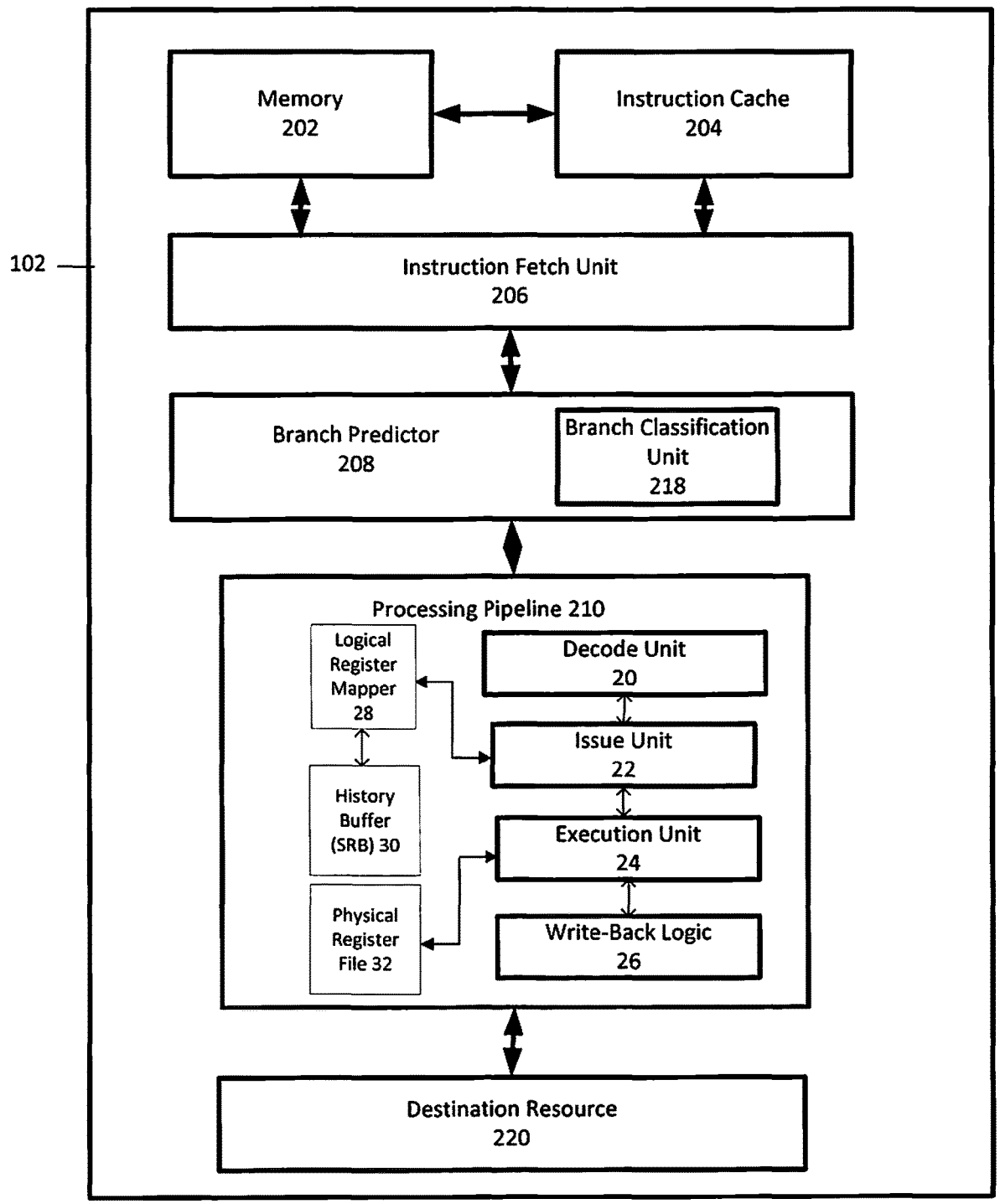
FIG. 2 illustrates a block diagram of a processor in which certain aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 110.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries which provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architectured register states and backs up the logical register file data when a new instruction is dispatched. In this regard, the history buffer 30 stores information from the logical register mapper 28 when a new instruction evicts data from the logical register mapper 28 in case the new instruction is flushed and the old data needs to be recovered. The history (SRB) 30 buffer keeps the stored information until the new instruction completes. The history buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further details as relevant will be provided below.

In certain aspects, a CPU 110 may have multiple execution/processing slices with each slice having one or more of the units shown in FIG. 2. For example, each processing slice may have its own processing pipeline 210 with functional/execution units 24. A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor, so that multiple threads may be simultaneously executed by the multi-slice processor. Simultaneous processing in multiple slices may considerably increase processing speed of the multi-slice processor. In single-thread (ST) mode a single thread is processed, and in SMT mode multiple threads are processed, e.g., in one or more embodiments two threads (SMT2) or four threads (SMT4) are simultaneously processed.

Figure 3:
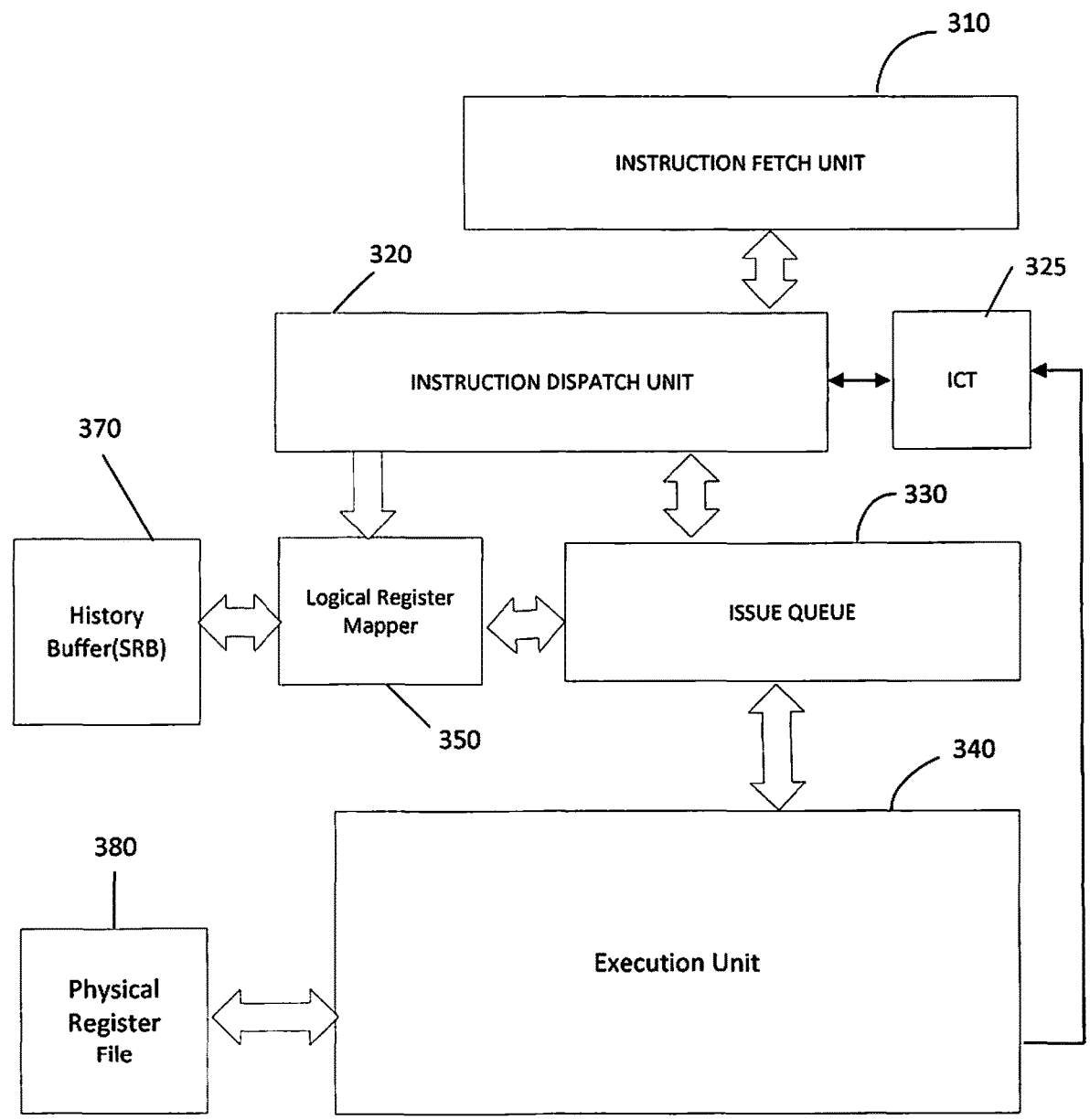
FIG. 3 illustrates a block diagram of a portion of a multi-slice processor in accordance with an aspect of the disclosure in which certain aspects of the present disclosure may be practiced.

FIG. 3 illustrates a block diagram of a portion of a processor 110. The pipeline 300 in the processor 110 in FIG. 3 includes Instruction Fetch Unit 310, Instruction Dispatch Unit 320, Issue Queue (ISQ) 330, Instruction Completion Table (ICT) 325, Execution Unit 340, Logical Register Mapper 350, history buffer (SRB) 370, and Physical Register File 380. The Execution Unit 340 may include one or more queues to hold instructions for execution by the Execution Unit 340.

The Instruction Fetch Unit 310 fetches instructions to be executed by the processor 110 or processor slice and sends them to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data, for example, to be used in an operation specified in an instruction dispatched to an execution unit 340, and the result of the operation performed by the Execution Units 340 may be written to the designated target register entry in the physical register file 380.

When data is not ready, e.g., not within the appropriate data cache or register, delay can result as the ISQ 330 will not issue the instruction to the Execution Unit 340. For at least this reason, the Issue Queue (ISQ) 330 typically issues instructions to the Execution Units 340 out-of-order so instructions where the required data is available can be executed. Dispatch Unit 320 will stamp each instruction dispatched to the Issue Queue 330 with an identifier, e.g., identification tag (iTag), to identify the instruction. The Dispatch Unit 320 may stamp instructions with other information and meta data. The instructions (iTags) typically are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

The Execution Unit 340 executes instructions out-of-order and when the Execution Unit 340 finishes an instruction, the Execution Unit 340 will send the finished instruction, e.g., iTag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. The instruction entry in the ICT typically will not identify the instruction as complete until all older instructions in the thread are completed.

Logical register mapper 350 contains meta data (e.g., iTag, RFTag, etc.) which provides a mapping between logical register entries (LReg) and entries in physical register file 380. The RFTag is the pointer that correlates a logical register entry (LReg) to a physical register file entry. For example, when an instruction wants to read a logical register, e.g., the logical register mapper 350 tells issue queue 330, execution unit 340 and or other unit, where in the physical register file 380 it can find the data, e.g., physical register array entry.

There are circumstances when the instructions and corresponding entries in the logical register mapper 350 will need to be restored. For example, where an interruptible instruction, e.g., branch mispredict, occurs, the information in the logical registers will need to be flushed and restored. History buffer (SRB) 370 is provided to save a processor state before, for example, an interruptible instruction, so that if an interrupt occurs, control logic may recover the processor state to the interrupt point by restoring the content of registers, memory cache, and main memory. Logical register entries are restored from the history buffer (SRB) 370 to the logical register mapper 350. History buffer (SRB) entries to be recovered are read from the history buffer (SRB) and written to the logical register mapper 350. The history buffer (SRB) 370 restores the register meta data, iTag, and the RFTag pointers to the logical register mapper 350 so instructions know where to get the correct data.

In operation, when a new instruction with an instruction tag (iTag) produces a value to be stored in a logical register "x" after it is executed, the prior value in logical register "x" is evicted from logical register "x", and the data and information associated with the instruction is stored in the history buffer (SRB) 370. That is, history buffer (SRB) 370 contains entries the logical register mapper 350 evicted from the logical register mapper 350 by younger instructions. History buffer (SRB) 370, in an embodiment, stores iTag and Register File tag (RFTag) information. The RFTag is a pointer that correlates an entry in a logical register to an entry in the Physical Register File 380. The information stored in the history buffer (SRB) 370 in an embodiment also includes the iTag and RFTag of the instruction that evicted the logical register entry (i.e., the evictor iTag and evictor RFTAG) from the logical register. History buffer (SRB) 370 may store and track other information. The description of data stored by history buffer (SRB) 370 is only illustrative and different data may be stored depending upon design parameters of the processor. The history buffer (SRB) 370 has an interface to the logical register mapper 350 to recover the iTag, and register file tag (RFTag) (and other meta data)

for each evicted logical register entry (LReg). The information is kept in the history buffer (SRB) 370 in a history buffer entry until the new instruction (evictor instruction) is completed. At which point there is no reason to keep the old entry in the history buffer, e.g., SRB 370, and the entry can be removed from the history buffer, as there is no flush recovery where the history buffer (SRB) entry could be recovered.

In one or more embodiments, a processor will have status and control (XFVC) registers. Status and control registers are registers that are used to store information on the status of the processor, system units, etc. and/or information used to configure and control the processor and/or system units. As discussed above, the mapping or rename of logical registers to physical register addresses is carried out by a mapper, e.g., mapper 350. The backup of previous states of each status and control register is stored in a history buffer 370, e.g., Save & Restore Buffer (SRB).

These status and control registers, as well as other registers, in one or more instances, are not renamed (mapped) as entire registers, but are renamed (mapped) by different bit ranges or fields within the logical or architectural register. That is, multiple fields are stored in the same physical register entry. Multiple fields in an embodiment are stored within a single physical register file in predefined bit ranges, e.g., bit fields, that do not overlap. The fields, in an embodiment, are predefined to be written to bit ranges within the physical register. This field-aligned approach to the register file allows storage of multiple fields within a single register entry without overlap, preferable increasing storage efficiency and reducing the number of register file entries. In one or more embodiments, multiple fields (e.g., status and control register fields/entries/information) are mapped to the same physical register.

An example of multiple fields mapped (renamed) to the same physical register is shown in FIG. 4. FIG. 4 illustrates physical register 480 having four register entries 481-484, preferably four status and control (XFVC) registers each broken up into multiple fields of different sizes. In the example of FIG. 4, each register entry is eighteen (18) bits wide, and supports writing up to four (4) fields within an entry. The bit field width of the register and the number of fields it can support may be more or less. The fields are predefined bit ranges within the register entry. The defined bit ranges of the various fields permits the execution unit to know where to look for sourcing, and where to align write back data.

In FIG. 4, physical register 1 (481) has field A, field B, and field C written thereto where field A is a three-bit field defined by bits 4:6, field B is a two-bit field defined by bits 7:8, and field C is a three-bit field defined by bits 9:11. Register 2 (482) in FIG. 4 contains field D, field E, and field F, defined by eleven-bit field 0:11, four-bit field 11:14, and three-bit field 15:17, respectively. Register 3 (483) and 4 (484) each contain four fields, fields G, H, I & J as well as fields K, L, M, & N, respectively, each defined by a four bit-field as shown in FIG. 4. FIG. 4 is only an illustrative example of a physical register. Physical register 480 may have more or less entries and each entry 482 may have more or less fields defined by more or less predefined bits, and/or by different predefined bit ranges. With the various fields as shown in FIG. 4, field A will always be written to bit range 4:6, field D will always be written to bit range 0:10, etc. Physical register 480 can support writing any combination of fields that do not share any bits in their predefined range, even if they are part of different logical registers. Allowed groupings of fields into one register entry are determined by the alignment of bits. For example, physical register entry 482 in FIG. 4 may contain field A, field B, and field G since they do not share any bits, i.e., there is no bit range overlap, however, the register 480 could not combine fields A and D.

The physical register 480 must not deallocate an entry until all fields within that register entry have completed corresponding evictor instructions. For example, the mapper must not deallocate physical register entry 482, register No. 2, until all of fields D, E, and F have completed an evictor instruction for each of those fields. If the physical register entry is deallocated before field D is properly evicted, then data from field D may be lost.

A mechanism in an embodiment is provided, preferably in the mapper, to track the number of fields allocated and deallocated from each physical register file entry. One embodiment of a mechanism 565 to track the number of fields allocated and deallocated from the physical register file 480 is shown in FIG. 5. In the example of FIG. 5, where each physical register file can hold up to four fields, a four bit mask (field) is used to track entry allocation and deallocation. In FIG. 5, an embodiment of tracker mechanism/table 565 is shown where the Tag column represents the physical register entry number, the Field Usage column contains the four-bit usage code to track the number of fields allocated and deallocated, and the Free column identifies whether the register (entry) has any fields that are allocated, or whether the register (entry) is completely deallocated. At allocation, one or more bits in the four-bit field usage code of the Field usage column are turned "on" (represented by a high bit or "1"), where each bit turned "on" (assigned a "1") is equal to the number of fields written in that entry, where the "1s" are left justified. So for example, in FIG. 5, Tag (register entry) 0 has all bits in the Field Usage "on" indicating all fields are written to, while Tag (register entry) 2 has one bit in the Field Usage "on" indicating only one field has been written. When a field is deallocated, a 0 is inserted in from the right, thus reducing the number of bits that are activated (on) by one. For example, if Tag (register entry) 2 in FIG. 5 has a field deallocated, a zero is shifted in from the right and the field usage code will show all zeros (like Tag (register entry) 1) and the Free column will change to Yes (Y) indicating that the Tag (register entry) is free. Accordingly, when all the bits have turned to zero as shown in Tag 1, the entry is free and can be reused for future names.

As described in connection with FIGS. 4 and 5, two or more fields can be combined and written to the same physical register. Typically, these plurality of fields written to a single entry in the physical file are backed up independently in a history buffer, e.g. Save & Restore Buffer (SRB). Thus, the two or more fields written to the same physical register file take two or more separate entries in the history buffer, e.g., SRB. In one or more embodiments, multiple fields written to the same physical register will be evicted by newer versions of these same fields written to a different register entry, creating multiple new entries in the history buffer that only differ by the field.

Disclosed is a system, architecture, and technique which permits two or more entries to be combined and/or compressed into one entry in the history buffer, thus reducing the amount of history buffer entries consumed by an instruction and increasing the processor core bandwidth. Whenever an instruction is dispatched that updates one or more fields, e.g., status and control (XFVC) fields, in the mapper, the new and prior mappings are evicted to the history buffer (SRB). In one or more embodiments, at eviction time, the history buffer (SRB) will receive evicted fields (e.g., status and control register fields) from the mapper. Detection logic, typically associated with the history buffer, determines if the evicted fields share iTags and evictor iTags, and if the field combination is supported. If all qualifying conditions are met, the history buffer (SRB) will allocate a single entry in the history buffer for the fields and change the field code to a predetermined, predefined combination code. If the new mappings (evictor) are flushed, then the correct fields in the history buffer (SRB) are restored to/recovered by the mapper. At recovery, if the mapper receives a combination code, it will restore incoming data from the history buffer (SRB) into multiple fields in the mapper through the use of decode logic, preferably decode logic associated with the mapper.

Figure 6:
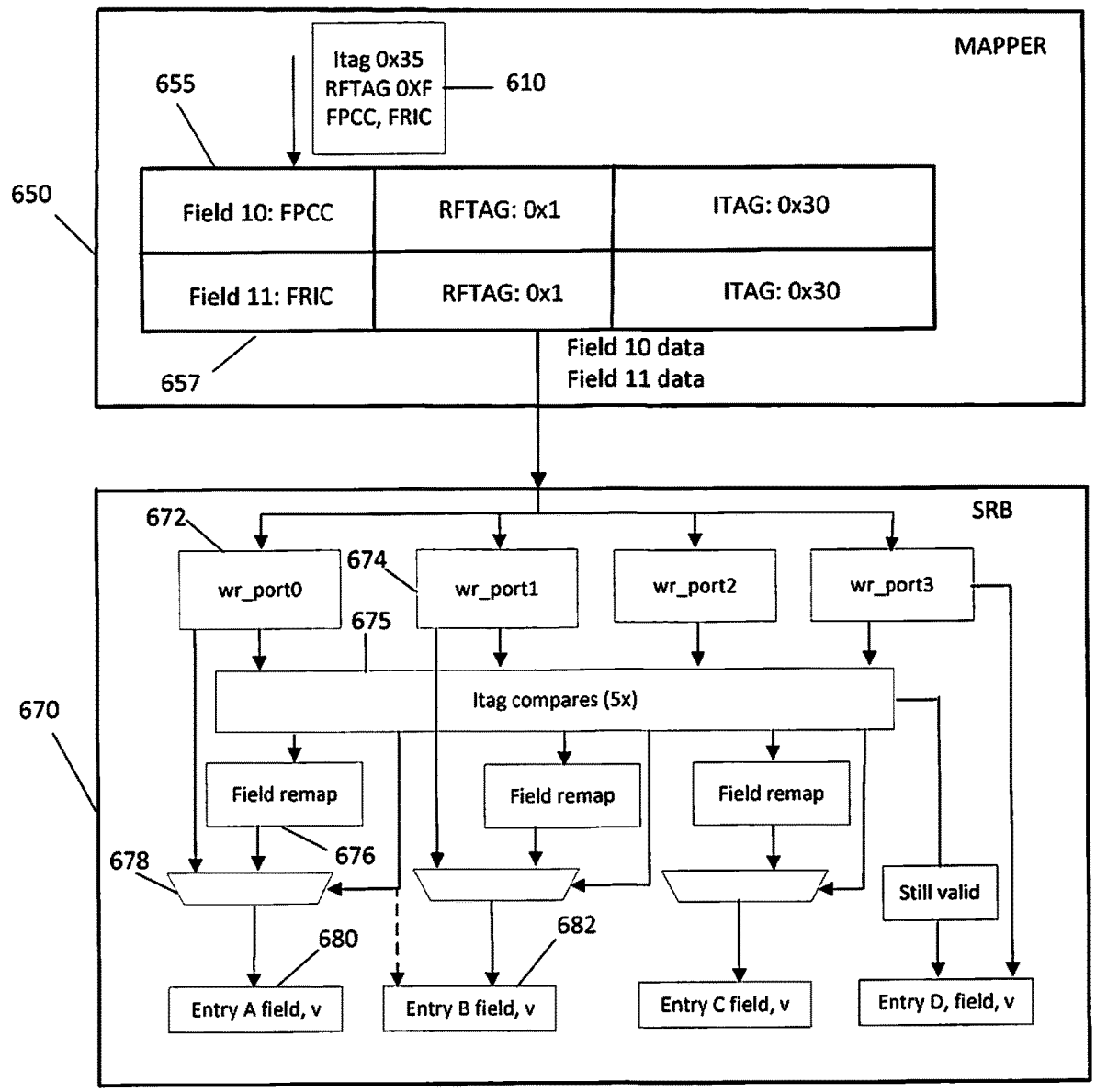
FIG. 6 illustrates a block diagram of an embodiment of a history buffer and a mapper for a logical register showing a history buffer allocation process.

FIG. 6 illustrates a block diagram of a mapper 650 and history buffer 670 where more than one field from the mapper can be written (allocated) into a single entry in the history buffer 670. Mapper 650 contains a plurality of field entries, two of which, field 10 and 11, are shown in FIG. 6. Mapper 650 typically contains more than two fields and may contain more fields, for example twenty (20) or more fields. The data contained in each field of mapper 650 in one or more embodiments includes a bit range for iTag information and a bit range for RFTag information, as well as other metadata and bit ranges for other information. The mapper 650 in FIG. 6 shows field 10 (FPCC), which contains RFTag 0x1 and iTag 0x30, while field 11 (FRIC), contains matching RFTag 0x1 and matching iTag 0x30, indicating that the two fields (fields 10 and 11) stored in the mapper are from the same instruction (iTag) and refer to the same register file tag (RFTag). In FIG. 6, an instruction 610 is dispatched that updates one or more fields 655, 657, e.g., status and control (XFVC) fields, in the mapper 650. Data is stored in history buffer (SRB) when a new instruction is dispatched that evicts a logical register entry (LReg) from the mapper 650. The data from fields 10 and 11 in the mapper 650 is evicted from the mapper 650 to the history buffer (SRB) 670. In FIG. 6, the incoming data to the mapper 650 includes field 10 (FPCC) and field 11 (FRIC), both with the same iTag 0x35 and same RFTag 0xF, which evicts the previous entries for fields 10 and 11 to the history buffer (SRB) 670.

The history buffer SRB 670 receives the evicted field data, e.g., the evicted field 10 data and the evicted field 11 data. Logic in the history buffer determines and/or detects if the evicted fields share iTags and evictor iTags, as well as if the field combination is supported by the processor. If all the qualifying conditions are met, e.g., the evicted fields share iTag and evictor iTag, and the evicted fields are combinable (the system supports the field combination), then the fields are remapped and written to one entry in the history buffer (SRB).

In an example, if more than one field is (multiple fields are) written to a register file, and dispatch evicts multiple fields from the mapper that were written to the same register file, then the history buffer (SRB) remaps the field (combines the fields) and writes one entry in the history buffer (SRB). As indicated above, logic, preferably located in the history buffer, determines in one or more embodiments whether the fields evicted to the history buffer have the same iTags. Detection logic, preferably located in the history buffer, in one or more embodiments, determines whether the evicted fields have the same evictor iTags. Detection logic, preferably located in the history buffer, in one or more embodiments, also determines whether the evicted fields have the same RFTags (indicating that the fields were written in the physical register as one entry). In one or more embodiments, the fields evicted from the mapper must be a compressible combination that is supported by logic, the remapper, and/or the processor. Two or more fields can not be arbitrarily written to the same history buffer (SRB) entry.

In order to qualify for two or more fields to be written into a single history buffer, in an embodiment, the field combination should be supported by the processor. Not all fields, e.g., status and control fields (XFVC), are combinable into a single history buffer entry as the predefined bit ranges for the fields may overlap, and/or program logic may not support the combination of fields. For this reason, in one or more embodiments, the history buffer (SRB) checks whether the evicted fields are combinable.

In the example of FIG. 6, a portion of the history buffer (SRB) 670 is shown that has four (4) write ports that can receive data from mapper 650. In an embodiment the history buffer (SRB) 670 is a block with approximately sixty-four (64) entries (per super slice). It is contemplated that history buffer (SRB) 670 may have more or less entries, more or less slices, and more or less write ports per slice. In the specific example of FIG. 6, field 10 data is received by a first write port 672 and field 11 data is received by a second write port 674. After receiving the data on write ports 672, 674, various checks and comparisons are performed at comparator 675 to determine whether the evicted fields qualify to be written into a single entry in the history buffer.

In one or more embodiments, comparator 695 determines whether the evicted fields, e.g., field 10 and 11, share iTags and evictor iTags, and that the field combination is supported. That is, all the evicted fields have to be evicted by the same instruction (same iTags) having the same register tags (RFTag). In one or more embodiments, the evicted fields need to have the same evictor iTags, and in one or more embodiments the evictor instructions have to be the same fields as the evicted fields. In addition, the field combination has to be feasible and supported. After the comparator 675, and if the qualifying conditions are met, the two fields, field 10 and field 11, are combined and/or compressed into one entry in the history buffer 670.

More specifically, in an embodiment, after comparator 675, if the qualifying conditions are met and the two fields are to be written as a single entry in the history buffer 670, the field(s) are remapped in Field Remapper 676. That is, the field data, e.g., field 11 data, from one of the write ports 672, 674 is driven to Field Remapper 676 where data is remapped to the appropriate bit range. Field data, e.g., field 10 data, is driven from the write port 672 to multiplexor 678 where field 10 data is combined with field 11 data remapped in field remapper 676, and the appropriate combination field code is written to entry 680. The field remapper in an embodiment changes the filed identification (Id) stored in the entry in the history buffer (SRB). The XFVC field data in the register file array does not change. For example, where an instruction with field "x" and field "y" are evicted from the mapper, instead of writing history buffer (SRB) entries with field "x" and field "y", one history buffer (SRB) entry with field "z" is written, where "z" indicates a combination of fields "x" and "y" and "z" is the new field identification (Id) output from the remapper function. Where two entries arrive from the mapper and the remapper compresses them, in an embodiment, the redundant write entry is invalidated. The data written to entry 680 in history buffer (SRB) 670 in one or more embodiments includes a bit range to identify the field code contained in the history buffer entry, e.g., a single field code or combination field code. In one or more embodiments, the data stored in each history buffer (SRB) entry includes a bit range for the field code, a bit range for the register file tag (RFTag), a bit range for the instruction tag (iTag), a bit range for the evictor instruction tag (evictor iTag) and a bit range for the evictor RFTag. Other metadata can and typically is included in the history buffer (SRB) entries.

Figure 7:
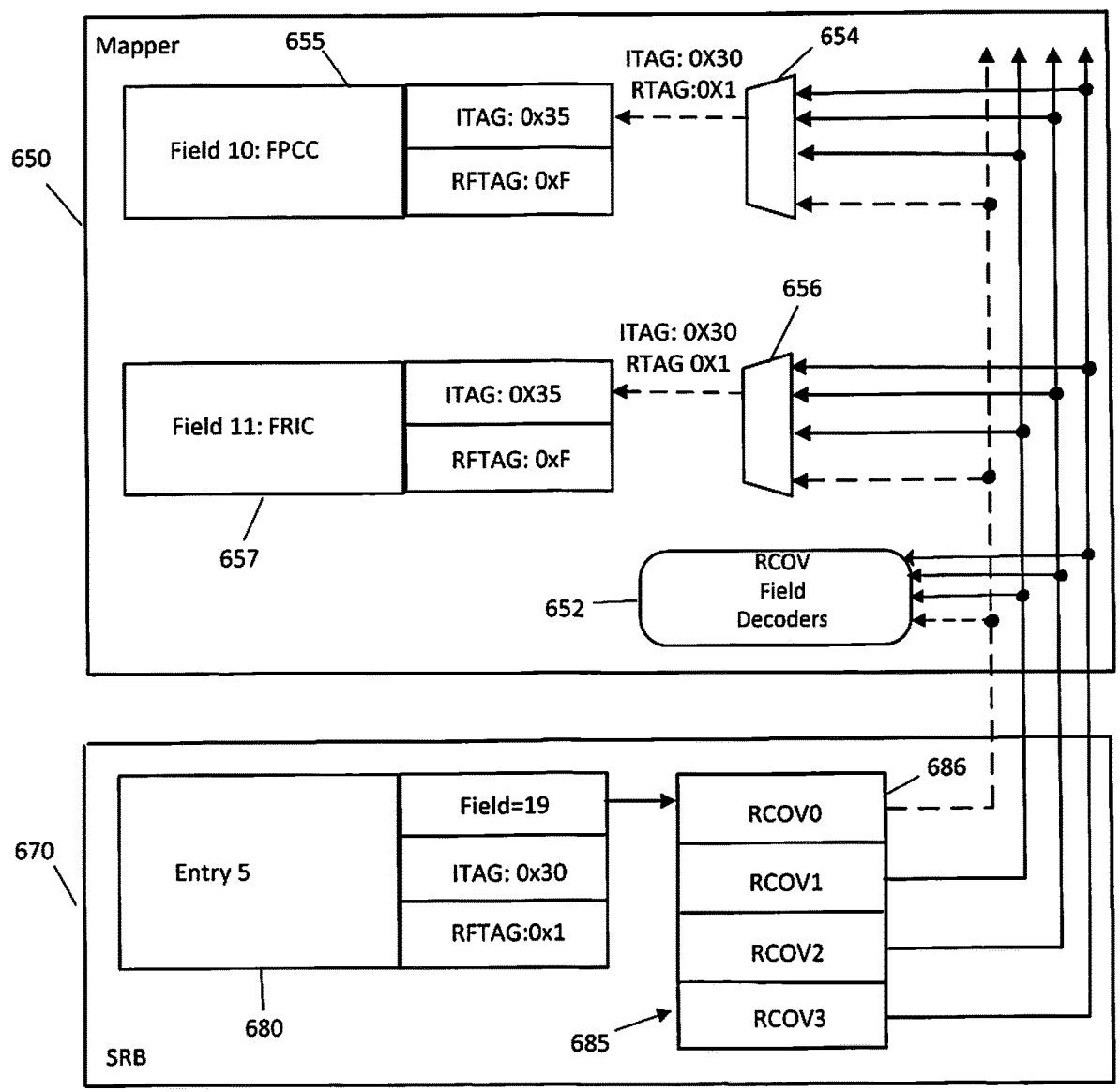
FIG. 7 illustrates a block diagram of an embodiment of a history buffer and a logical register showing a history buffer to mapper recovery process.

History buffer (SRB) 670 is used in the event a restore operation is necessary. For example, if the mapper 650 is flushed, the correct fields in the history buffer (SRB) are restored to the mapper 650. In an embodiment, the read/recovery ports of history buffer (SRB) 670 interface with logical register mapper 650 in order to restore and recover the contents of the logical register in the event of a flush recovery operation. FIG. 7 illustrates mapper 650 and history buffer (SRB) 670 where a history buffer (SRB) entry, and more specifically a combined/compressed history buffer entry, is being recovered/restored to the mapper 650. History buffer (SRB) 670 has a plurality of entries and in FIG. 7 entry 680 is shown, which is the history buffer entry that was allocated/written in the example of FIG. 6. In an embodiment, there are multiple history buffer (SRB) recovery ports associated with, e.g., connected to, the logical register mappers. History buffer 670 in FIG. 7 includes a plurality of recovery ports 685. The history buffer (SRB) 670 in an embodiment selects one history buffer entry per recovery port, and in the example of FIG. 7 entry 680 in the history buffer is driven to recovery port 686. Entry 680 in the example of FIG. 7 has a field code 19 which is predefined as being a combination field that has two fields written to one history buffer (SRB) entry 680. Since entry 680 is a combination of fields, each field is known to have the same instructions (iTags) and the same associated register field tags (RFTags). And, each field is known to occupy a defined bit range.

Mapper 650 in FIG. 7 illustrates four recovery ports receiving data from the history buffer (SRB) 670. Mapper 650 can have more or less recovery ports. Data from the history buffer recovery port 686 is driven to one or more field decoders 652 and to one or more multiplexors 654 and 656. Each multiplexor 654 and 656 is connected to a mapper field 655, 657 as shown in FIG. 7 where multiplexer 654 is associated with/or connected to mapper field 655 and multiplexor 656 is associated with/or connected to mapper field 657.

Recovery field decoder 652 receives the field code, e.g., field code 19, and from the field code knows if the incoming data is a combination that was compressed into a single entry 680 in the history buffer. The mapper 650 will restore the data into the one or more corresponding fields in the mapper 650. Mapper logic, preferably logic in the field decoder 652, receives the field code and sets the bits in the vector to drive the recovery data to the appropriate mapper fields, and where a combination code is received to the appropriate one or more mapper fields. In the example of FIG. 7, mapper 650, and more particularly recovery field decoder 652, recognizes field code 19 and knows from the field code that the history buffer (SRB) entry 680 received by the mapper 650 has multiple fields written to the same history buffer entry. The recovery field decoder 652 sends a signal to multiplexor 654 so that field 10 data is written to field 655 in mapper 650 and sends a signal to multiplexor 656 so that field 11 data is written to field 657 in mapper 650. Field 10 data pertaining to instruction tag (iTag) 0x30 and register field tag (RFTag) 0x1 is written to field 655 and Field 10 data pertaining to iTag 0x35 and RTFag 0xF is flushed from the mapper 650. Field 11 data in the mapper entry 657 pertaining to iTag 0x35 and RFTag 0xF is flushed and field 11 data pertaining to iTag 0x30 and RFTag 0x1 is written to mapper entry 657.

Figure 8:
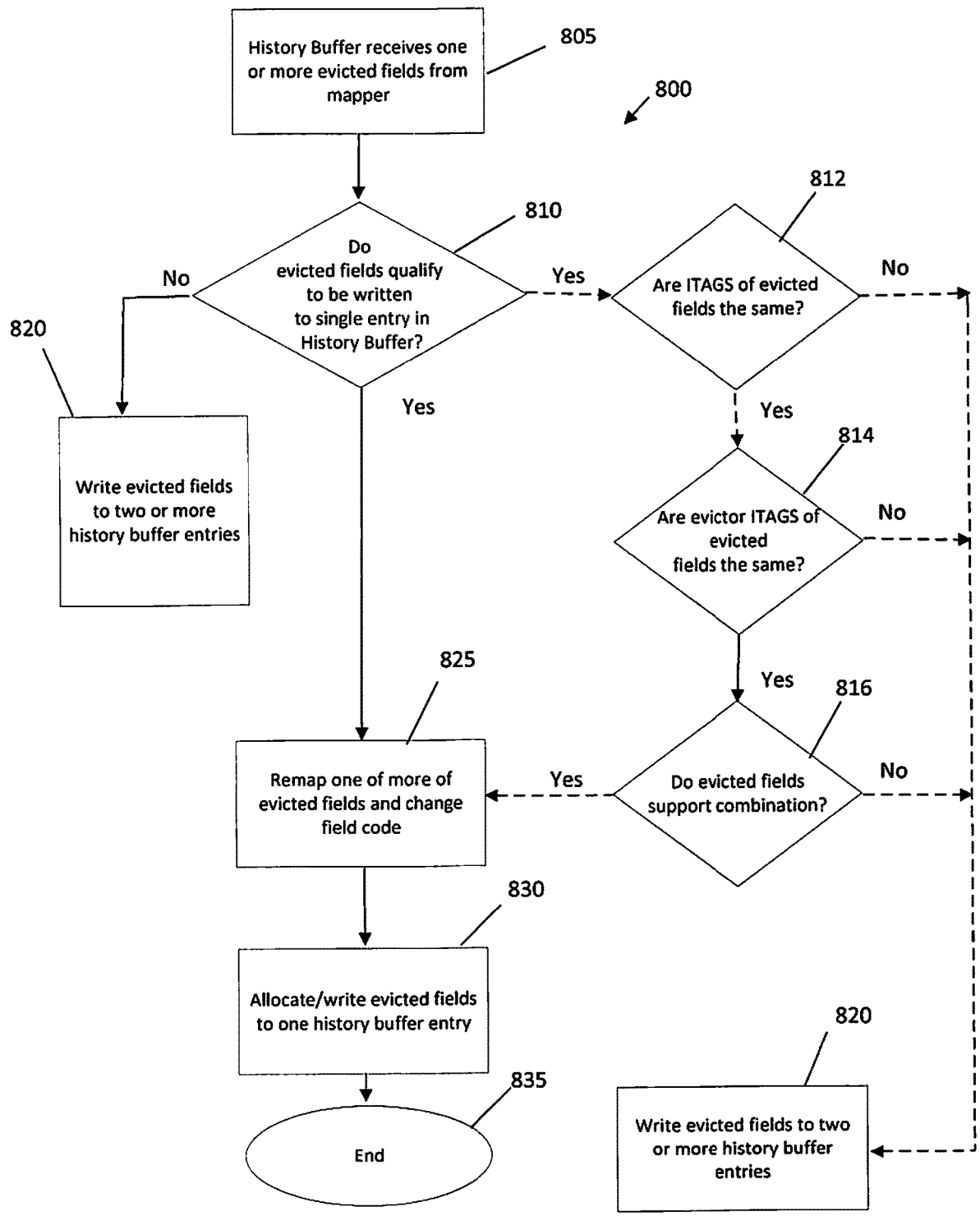
FIG. 8 illustrates a flow chart of an illustrative method of combining multiple logical register mapper fields in a history buffer entry.
Figure 9:
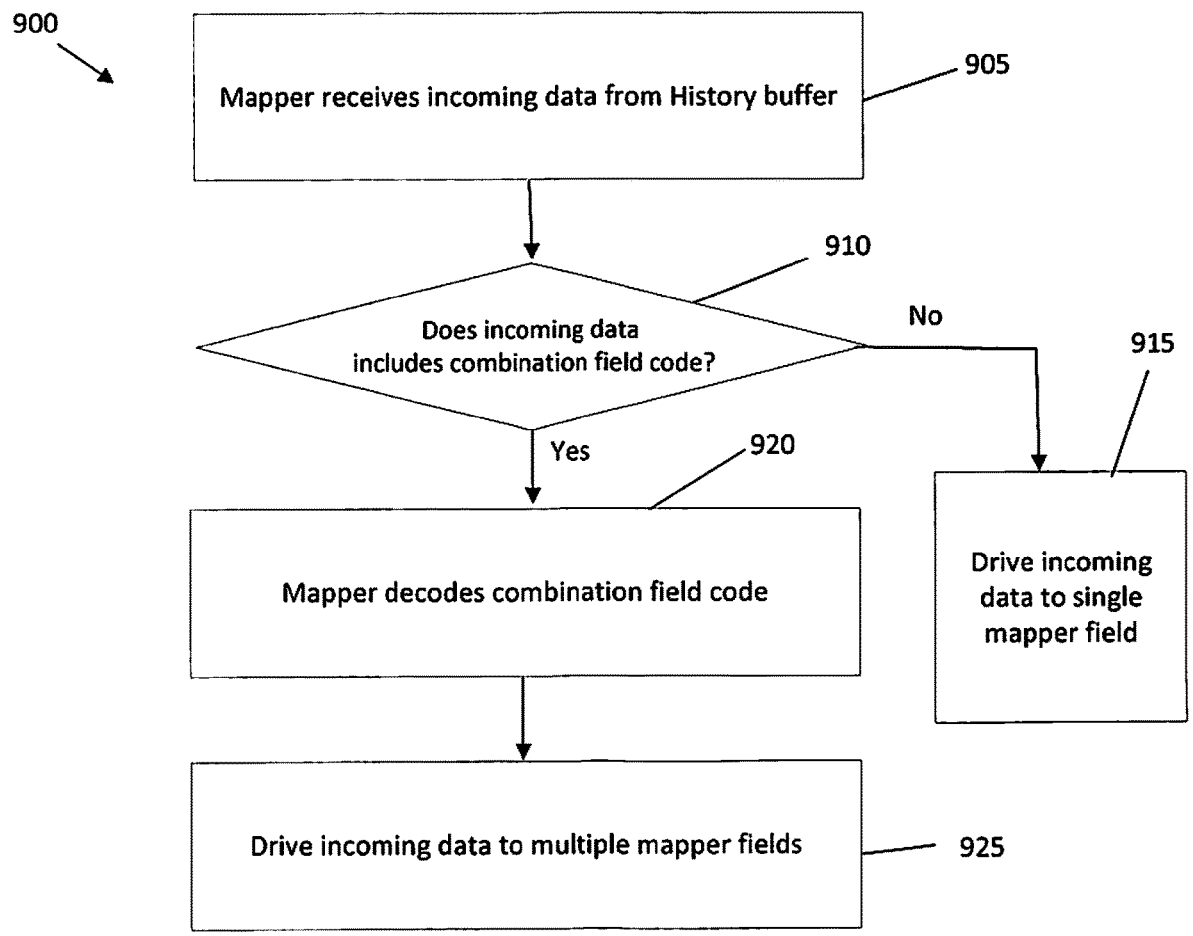
FIG. 9 illustrates a flow chart of an illustrative method of recovering history buffer data to a logical register mapper.

FIG. 8 is an exemplary flowchart in accordance with an embodiment illustrating and describing a method 800 of handling data in an information handling system, and more specifically a method of writing evicted data from a mapper to a history buffer, and more particularly a method of combining evicted fields from a mapper into a single history buffer entry, in accordance with an embodiment of the present disclosure. FIG. 9 is an exemplary flow chart in accordance with an embodiment illustrating and describing a method 900 of handling data in an information handling system, and more specifically a method of recovering history buffer entries. While the methods 800 and 900 are described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8 or 9, but the process may be integrated and/or one or more steps may be performed together, simultaneously, or the steps may be performed in the order disclosed or in an alternate order.

A method 800 of handling data in a processor is illustrated in FIG. 8, and more specifically a method of compressing or combining two or more evicted fields from a mapper into a single entry in a history buffer. The method 800 of FIG. 8 in one or more embodiments can reduce the number of history buffer entries written and increase processor bandwidth.

The method 800 as shown in FIG. 8 includes at 805 one or more fields being evicted by the mapper and received by the history buffer. In an example, the one or more fields are evicted when an instruction is dispatched that updates one or more fields in the mapper. That is, data is stored in the history buffer (SRB) when a new instruction is dispatched that evicts a logical register entry (LReg) from the mapper.

At 810 it is determined whether the evicted fields qualify to be written to a single entry in the history buffer. If the evicted fields do not qualify to be written to a single history buffer entry (810:No), then the process 800 continues to 820 where the evicted fields are written to two or more entries in the history buffer. If the evicted fields do qualify to be written to a single history buffer entry, then the process continues to 825 where one or more evicted fields are remapped and the field code is changed to a combination field code.

Determining whether the evicted fields received by the history buffer qualify to be written to a single entry in the history buffer can include one or more steps, determinations, and/or comparisons. For example, the qualification at 810 can include at 812 determining whether the iTags of the one or more evicted fields received by the history buffer are the same. If at 812 the iTags of the evicted fields are not the same (812: No), then the process 800 continues to 820 where the history buffer writes each field in a separate history buffer entry. If at 812 the iTags of evicted fields are the same (812: Yes), then the method continues to 814. At 814 it is determined whether the evictor iTags of the evicted fields are the same. If at 814 the evictor iTags of the evicted fields are not the same (814: No), then the process continues to 820 where the evicted fields are not combined and are written to two or more history buffer entries.

If at 814 the evictor iTags of the evicted fields are the same (814: Yes), then the process continues to 816. At 816 it is determined whether the evicted fields support combining the fields into one history buffer entry. In this regard, the evicted fields should be fields that are combinable. In other words, the two or more evicted fields must be fields that are combinable with no overlapping bit range and have a combination code that is supported by the processor logic. In one or more aspects, determining whether the evicted fields are combinable includes determining whether the evicted fields have the same register file tag (RFTag). In an embodiment, register file tag (RFTag) equality can be inferred from iTag equality in 812 and 814. If the evicted fields do not support being combined (816:No), then the process 800 continues to 820 where the evicted fields are written to two or more history buffer entries. If the evicted fields support being combined, e.g., the field codes indicate the evicted fields are combinable in a supported combination code (816: Yes), then the process continues to 825.

If the evicted fields qualify to be written to a single entry in the history buffer (810: Yes; 816: Yes), then at 825 one or more of the evicted fields are remapped and the field code is changed to a combination field code. The evicted fields are then allocated, written, and/or stored in one history buffer entry at 830. After the evicted fields are written to the history buffer, the process 800 is complete and ends.

FIG. 9 Is a flow chart of a method 900 for recovering history buffer entries, more specifically recovering history buffer entries where multiple mapper fields were written into a single history buffer entry, such as, for example, as illustrated by method 800 in FIG. 8. At 905, the mapper receives incoming data from the history buffer (SRB), more specially in accordance with an embodiment, data from a single history buffer entry received from a history buffer recovery port, preferably a single history buffer (SRB) recovery port. The incoming data from the history buffer (SRB) is received by one or more restore ports on the logical register mapper, and in an embodiment incoming data from a single history buffer recovery port is received by a single restore port on the logical register mapper.

At 910, the mapper determines whether the incoming data includes a combination field code, or otherwise includes combined fields of data. If the incoming data does not have a combination code or combined fields of data (910: No), then the process 900 continues to 915 where the incoming data pertaining to the single history buffer entry is directed to a single mapper field. If at 910 the incoming data has a combination field code (910:Yes), then the mapper decodes the combination code at 920. After the combination code is decoded, the incoming data at 925 is directed to multiple mapper fields. In one or more embodiments, the incoming data is directed to the corresponding mapper fields according to the combination code.

While the illustrative embodiments described above are preferably implemented in hardware, such as in units and circuitry of a processor, various aspects of the illustrative embodiments may be implemented in software as well. For example, it will be understood that each block of the flowchart illustration in FIGS. 8 and 9, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

In an embodiment, a computer system for processing information is disclosed where the computer system includes at least one computer processor for processing instructions, a logical register that includes entries to store data associated with the processor instructions, a history buffer having a plurality of entries for storing information evicted by a younger processor instruction, the history buffer having a plurality of recovery ports associated with the logical register, and one or more computer readable non-transitory storage media. The computer system in an aspect includes programming instructions stored on the one or more computer readable non-transitory storage media for execution by the at least one processor, the programming instructions comprising (a) programming instructions for partitioning the logical register into a plurality of ranges of logical register entries, (b) programming instructions for assigning, preferably on a per slice basis, at least one recovery port of the history buffer, preferably at least two (2) recovery ports, to each range of logical register entries, and (c) programming instructions for directing history buffer entries to the assigned recovery port based upon the logical register entry associated with the history buffer entry. In an embodiment, the processor further includes programming instructions for recovering history buffer entries to a mapper dedicated to the range of logical register entries to which the history buffer entry is associated and/or assigned. The processor in an aspect further includes programming instructions to restore the logical register entries. In an embodiment, the processor is configured to assign each recovery port in the history buffer to a dedicated mapper such that one recovery port per execution slice is assigned to one range of the logical register entries.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems that perform the specified functions or steps, or by combinations of special purpose hardware and computer instructions.

The programs described herein are identified based upon the application for which they are implemented in a specific embodiment of the invention. However, it should be appreciated that any particular nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, chip, code, or portions thereof, which comprises one or more circuits, and/or executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
evicting one or more evicted fields from a logical register mapper;
receiving, by a history buffer, the one or more evicted fields from the logical register mapper;
determining whether two or more of the evicted fields from the mapper qualify to be written to a single entry in the history buffer; and
in response to the two or more evicted fields qualifying to be written to a single entry in the history buffer, writing the two or more qualifying evicted fields received from the mapper to a single entry in the qualified history buffer,
determining whether two or more evicted fields qualify to be written to a single history buffer entry includes, determining whether at least two of the evicted fields have the same (a) iTags, (b) RFTags, or (c) evictor instructions.

2. The method of claim 1, further comprising in response to the two or more evicted fields not qualifying to be written to a single entry in the history buffer, writing the two or more evicted fields to multiple history buffer entries.

3. The method of claim 1, further comprising remapping one or more of the qualified evicted fields.

4. The method of claim 1, further comprising changing the field code of the history buffer entry to which two or more qualifying evicted fields were written to a combination code.

5. The method of claim 1, wherein the evicted fields contain status and control register information.

6. The method of claim 1, wherein determining whether two or more evicted fields qualify to be written to a single history buffer entry includes determining whether at least two of the evicted fields are combination fields that are supported by the processor and have no overlapping bit ranges.

7. The method of claim 1, further comprising the mapper receiving incoming data from a recovery port of the history buffer.

8. The method of claim 7, further comprising determining whether the incoming data from the history buffer recovery port includes a combination field code, and in response to the incoming data having a combination field code, writing the incoming data to two or more mapper fields in the mapper.

9. A system for processing information, the system comprising:
at least one processor for processing instructions, the processor comprising:
one or more logical register mappers having a plurality of fields for storing data; and
one or more history buffers having a plurality of entries for storing fields evicted from at least one of the logical register mappers, wherein the processor is configured to
evict one or more evicted fields from at least one of the logical register mappers;
receive in the history buffer the one or more evicted fields from the at least one of the logical register mappers;
determine whether the two or more of the evicted fields received from the at least one of the mappers qualify to be written to a single entry in the history buffer; and
in response to the two or more evicted fields qualifying to be written to a single entry in the history buffer, writing the qualified two or more evicted fields from the logical register mapper to a single entry in the history buffer,
wherein to determine whether two or more evicted fields qualify to be written to a single history buffer entry the processor is further configured to determine whether the instructions of at least two of the evicted fields are the same.

10. The system of claim 9, wherein the processor is further configured to remap one or more of the qualified evicted fields.

11. The system of claim 9, wherein the processor is further configured to change the field code of the history buffer entry to which two or more qualifying evicted fields were written to a combination code.

12. The system of claim 9, wherein to determine whether two or more evicted fields qualify to be written to a single history buffer entry the processor is further configured to determine whether at least two of the evicted fields are combination fields that are supported by the processor and have no overlapping bit ranges.

13. The system of claim 9, wherein the history buffer has one or more recovery ports and the mapper is configured to receive incoming data from the one or more recovery ports of the history buffer, and the processor is configured to determine whether the incoming data from the history buffer recovery port includes a combination field code, and in response to the incoming data having a combination field code, to write the incoming data to two or more mapper fields in the mapper.

14. A system for processing data, the system comprising:
at least one processor for processing instructions;
one or more logical register mappers for mapping logical register fields to entries in a physical register, each logical register mapper having a plurality of fields for storing data;
one or more history buffers associated with the one or more logical register mappers, each history buffer having a plurality of entries for storing fields evicted from at least one of the logical register mappers; and non-transitory computer readable storage medium comprising program instructions that when executed by the processor cause the processor to:

evict one or more evicted fields from at least one of the logical register mappers;

receive in the one or more history buffers the one or more evicted fields from the one or more of the logical register mappers;

determine whether the two or more evicted fields received from the one or more mappers qualify to be written to a single entry in the one or more history buffers; and in response to the two or more evicted fields qualifying to be written to a single entry in the one or more history buffers, writing the qualified two or more evicted fields from the one or more of the logical register mappers to a single entry in the one or more history buffers, wherein determining whether two or more evicted fields qualify to be written to a single history buffer entry includes, determining whether at least two of the evicted fields have the same (a) iTags, (b) RFTags, or (c) evictor instructions.

15. The system of claim 14, wherein the processor further comprises program instructions that when executed by the processor cause a processor to remap one or more of the qualified evicted fields.

* * * * *